G. Benns,
Sad Iron Heater.
No. 112,208. Patented Feb. 28, 1871.
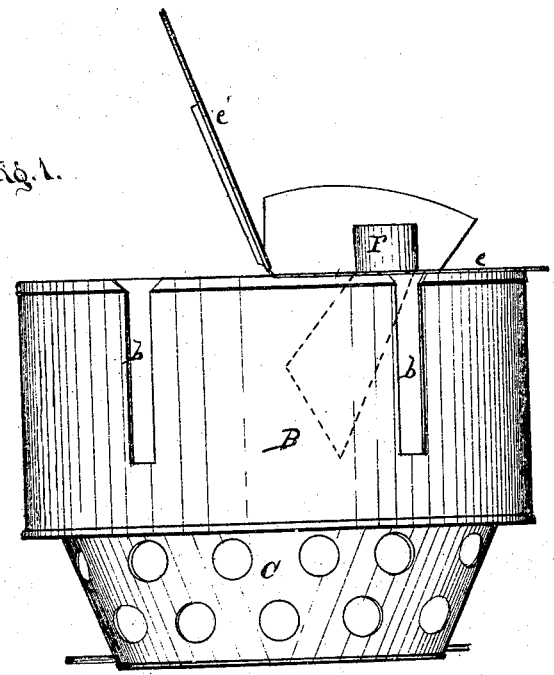
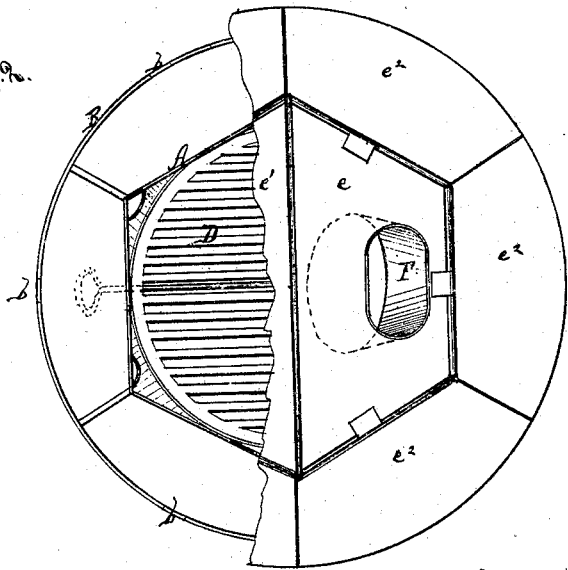
Witnesses:
S. J. Noyes.
J. H. Pierson.
Inventor:
George Benns by
H. W. Beadle. Atty

United States Patent Office.

GEORGE BENNS, OF ROCKFORD, ILLINOIS, ASSIGNOR TO HIMSELF AND LUCIUS M. WEST, OF SAME PLACE.

Letters Patent No. 112,208, dated February 28, 1871.

IMPROVEMENT IN SAD-IRON HEATERS.

The Schedule referred to in these Letters Patent and making part of the same.

To all whom it may concern:

Be it known that I, GEORGE BENNS, of Rockford, in the county of Winnebago and State of Illinois, have invented a new and useful Improvement in Sad-Iron Heater; and I do hereby declare that the following is a full and exact description of the same, reference being had to the accompanying drawing and to the letters of reference marked thereon.

This invention has for its object the production of a device adapted for heating sad-irons economically and expeditiously, and consists of certain details of construction, which will be fully described hereinafter.

In the drawing—

Figure 1 represents a side elevation of my invention.

Figure 2, a plan view of the same.

To enable others skilled in the art to make and use my invention, I will now proceed to describe fully its construction and manner of operation.

A represents an inner hexagonal or other many-sided vessel, the sides of which correspond in length and breadth more or less closely with the dimensions of the sad-irons to be heated. The bottom of this vessel is preferably made open, but can be closed if desired.

B represents an outer cylindrical vessel which surrounds the vessel A, and is united to it at its bottom edge by means of a connecting flange, and at its top edge by suitable brace-rods.

$b\ b$ represent vertical slots in the vessel B, arranged at suitable intervals corresponding to the vertical center lines of the sides of the inner vessel A, which are adapted to permit the projection of the handles of the sad-irons.

C represents a perforated flaring strip, the upper edge of which is united to the flange connecting the vessels A and B, as shown.

This part, in connection with the revolving perforated grate D, forms the bottom of the heater.

E represents the cover, which is constructed of two main portions $e\ e^1$, covering the inner vessel, and a number of side portions, $e^2\ e^2$, corresponding to the sides of the inner chamber, as shown. One of the main portions $e$ is rigidly secured to the vessel A, and has hinged to it the other portion $e^1$. The sectional parts $e^2\ e^2$ are also hinged to the main portions, as shown.

F represents the stove-pipe, which opens below into the vessel A, with a funnel-shaped opening, and discharges above into any suitable pipe, or into the open air.

The operation is as follows:

Fire is kindled in the vessel A, or, if desired, the heater may be placed in one of the usual openings in the top of a stove, and receive its heat directly from the latter. The sad-irons are placed in the compartments formed between the inner and outer vessel, in which position their faces rest against the sides of the inner vessel A, and are consequently exposed to great heat.

It will be observed that each compartment may be opened, independently of all the others, by means of the sectional cover.

If desired, the pipe may be used for a downward draught by closing the stove. The upward draught, however, is preferred. By means of its specific construction the heat is generally diffused throughout the vessel.

Any proper material may be used in the construction of this heater; but it is preferred to use cast-iron for the inner vessel and sheet-iron for the outer.

This heater is simple in all its parts, can be cheaply constructed, and is very effective.

Having thus fully described my invention,

What I claim as new, and desire to secure by Letters Patent, is—

The specific device described, consisting of the vessels A B, bottom C D, cover E, and pipe F, when combined as described.

This specification signed and witnessed this 6th day of December, 1870.

GEORGE BENNS.

Witnesses:
G. W. FORD,
S. W. MARSH.